(12) United States Patent
Maercovich

(10) Patent No.: US 10,344,461 B2
(45) Date of Patent: *Jul. 9, 2019

(54) VALVE ACTUATION CONTROL FOR FLUSH URINAL AND TOILET APPARATUS

(71) Applicant: Jorge Maercovich, Chatsworth, CA (US)

(72) Inventor: Jorge Maercovich, Chatsworth, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/131,022

(22) Filed: Apr. 17, 2016

(65) Prior Publication Data

US 2017/0298608 A1    Oct. 19, 2017

(51) Int. Cl.
| | |
|---|---|
| *E03D 1/36* | (2006.01) |
| *E03D 5/10* | (2006.01) |
| *F16K 3/02* | (2006.01) |
| *F16K 3/08* | (2006.01) |
| *E03D 13/00* | (2006.01) |
| *F16K 31/04* | (2006.01) |

(52) U.S. Cl.
CPC .............. *E03D 5/105* (2013.01); *E03D 1/36* (2013.01); *E03D 13/00* (2013.01); *F16K 3/0254* (2013.01); *F16K 3/08* (2013.01); *F16K 31/042* (2013.01)

(58) Field of Classification Search
CPC .. E03D 5/105; E03D 5/10; E03D 1/36; E03D 1/30; E03D 13/00; E03D 13/005; F16K 3/0254; F16K 3/02; F16K 3/08; F16K 3/06; F16K 3/04; F16K 31/042; F16K 31/041; F16K 31/04; F16K 31/02

USPC ......... 251/129.11, 129.04, 129.01, 309, 310, 251/208; 4/301–311, 623
See application file for complete search history.

(56) References Cited

U.S. PATENT DOCUMENTS

| | | | | | |
|---|---|---|---|---|---|
| 3,831,621 | A | * | 8/1974 | Anthony | ............... F16K 3/08 137/270 |
| 4,309,781 | A | * | 1/1982 | Lissau | ............... E03D 5/10 4/304 |
| 4,431,028 | A | * | 2/1984 | Hendrick | ............... F16K 3/08 137/625.3 |
| 4,541,609 | A | * | 9/1985 | Smith | ............... F16K 31/05 192/69.61 |

(Continued)

FOREIGN PATENT DOCUMENTS

| | | | | | |
|---|---|---|---|---|---|
| GB | 2333143 | A | * | 7/1999 | ........... F16K 31/041 |
| GB | 2347197 | A | * | 8/2000 | ........... F16K 31/041 |

*Primary Examiner* — Reinaldo Sanchez-Medina
*Assistant Examiner* — David Colon-Morales
(74) *Attorney, Agent, or Firm* — Raymond Y. Chan; David and Raymond Patent Firm

(57) ABSTRACT

An actuation control for a flush system includes a cartridge valve being actuated between an opened position and a closed position to compete a flushing cycle. The cartridge valve includes a cartridge housing having a valve inlet for communicating with a water source and the valve outlet for guiding water to flow to the flush system, and a control disc unit which is supported in the cartridge housing at the valve inlet thereof and is orientated perpendicular to a water-in direction of the water for biasing against water pressure from said water source. At the closed position, the valve inlet is closed by the control disc unit for blocking the water to pass through the valve inlet. At the opened position, the valve inlet is opened up for allowing the water passing to the valve outlet so as to complete the flushing cycle of the flush system.

3 Claims, 7 Drawing Sheets

FIG.4

(56) References Cited

U.S. PATENT DOCUMENTS

| | | | | |
|---|---|---|---|---|
| 4,596,377 A * | 6/1986 | Taylor | F16K 3/085 | 251/248 |
| 4,815,150 A * | 3/1989 | Uhlmann | E03D 13/00 | 4/305 |
| 4,821,765 A * | 4/1989 | Iqbal | F16K 3/08 | 137/270 |
| 4,838,310 A * | 6/1989 | Scott | A01G 25/16 | 137/624.14 |
| 5,010,917 A * | 4/1991 | Iqbal | F16K 3/08 | 137/454.6 |
| 5,014,736 A * | 5/1991 | Korfgen | F16K 3/08 | 137/315.13 |
| 5,036,886 A * | 8/1991 | Olsen | F15B 9/03 | 137/625.65 |
| 5,079,495 A * | 1/1992 | Yasuo | E03D 5/105 | 320/101 |
| 5,342,024 A * | 8/1994 | Kim | E03D 5/105 | 251/129.12 |
| 5,398,717 A * | 3/1995 | Goncze | F16K 3/08 | 137/270 |
| 5,482,250 A * | 1/1996 | Kodaira | E03D 5/105 | 251/129.04 |
| 5,588,636 A * | 12/1996 | Eichholz | G05D 23/1393 | 251/129.04 |
| 5,664,761 A * | 9/1997 | Weyand | F16K 3/08 | 251/208 |
| 5,979,500 A * | 11/1999 | Jahrling | E03C 1/057 | 137/624.12 |
| 6,056,201 A * | 5/2000 | Ta | G05D 23/1393 | 137/625.4 |
| 6,317,717 B1 * | 11/2001 | Lindsey | E03C 1/055 | 137/559 |
| 6,561,481 B1 * | 5/2003 | Filonczuk | F16K 31/043 | 239/578 |
| 6,568,655 B2 * | 5/2003 | Paese | E03C 1/057 | 137/2 |
| 6,854,658 B1 * | 2/2005 | Houghton | F16K 11/0746 | 137/625.41 |
| 6,927,501 B2 * | 8/2005 | Baarman | C02F 1/325 | 290/43 |
| 7,177,725 B2 * | 2/2007 | Nortier | E03B 7/071 | 137/12 |
| 7,264,016 B2 * | 9/2007 | Molina | E03C 1/04 | 137/454.6 |
| 7,331,359 B2 * | 2/2008 | Shay | F16K 3/08 | 137/454.2 |
| 7,607,638 B2 * | 10/2009 | Wilson | F02M 26/74 | 123/568.21 |
| 7,802,590 B1 * | 9/2010 | Lai | F16K 3/08 | 137/454.6 |
| 7,946,504 B2 * | 5/2011 | Shapira | G05D 23/1393 | 137/897 |
| 8,317,155 B2 * | 11/2012 | Maercovich | F16K 31/05 | 251/129.03 |
| 8,407,821 B2 * | 4/2013 | Chan | E03D 5/105 | 4/406 |
| 8,464,998 B2 * | 6/2013 | Maercovich | E03C 1/057 | 251/30.04 |
| 8,807,521 B2 * | 8/2014 | Dunki-Jacobs | E03C 1/057 | 251/129.04 |
| 9,188,237 B2 * | 11/2015 | Dolenti | F16K 31/04 | |
| 9,574,336 B1 * | 2/2017 | Maercovich | E03D 5/105 | |
| 2005/0151106 A1 * | 7/2005 | He | F16K 3/08 | 251/208 |
| 2006/0169938 A1 * | 8/2006 | Woo | E03D 13/005 | 251/129.04 |
| 2006/0192166 A1 * | 8/2006 | Lange | F16K 3/08 | 251/264 |
| 2007/0068583 A1 * | 3/2007 | Johnson | F16K 27/045 | 137/625.31 |
| 2008/0054210 A1 * | 3/2008 | Smith | F16K 3/08 | 251/208 |
| 2009/0241248 A1 * | 10/2009 | Vollmar | E03D 5/105 | 4/313 |
| 2010/0031430 A1 * | 2/2010 | Chang | E03D 5/10 | 4/302 |
| 2010/0224811 A1 * | 9/2010 | Chang | F16K 3/08 | 251/231 |
| 2011/0017929 A1 * | 1/2011 | Guler | E03D 3/06 | 251/129.01 |
| 2011/0088799 A1 * | 4/2011 | Jung | E03C 1/055 | 137/607 |
| 2013/0139889 A1 * | 6/2013 | Gan | E03C 1/055 | 137/1 |
| 2014/0158920 A1 * | 6/2014 | Belz | E03D 5/105 | 251/129.01 |
| 2014/0306135 A1 * | 10/2014 | Maercovich | F16K 31/404 | 251/129.11 |
| 2015/0020298 A1 * | 1/2015 | Hsu | E03D 13/00 | 4/305 |
| 2016/0083948 A1 * | 3/2016 | Matsunaka | E03D 13/007 | 4/303 |
| 2016/0186867 A1 * | 6/2016 | Maercovich | F16K 3/08 | 251/129.11 |

* cited by examiner

VALVE ACTUATION CONTROL FOR FLUSH URINAL AND TOILET APPARATUS

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a flush apparatus, and more particularly to a valve actuation control for the flush urinal and toilet apparatus, which comprises a cartridge valve to be selectively actuated between an opened position and a closed position for completing a flushing cycle of the flush apparatus without any requirement of water cavity or diaphragm.

Description of Related Arts

Manual operated toilet room flush valves for use on urinals and water closets in public restrooms are well known. A conventional manual operated flush actuation apparatus comprises a valve body defining a water cavity and having a water inlet, a water outlet, a diaphragm having a water channel communicating between the water inlet and the water outlet, a relief valve disposed at the diaphragm for blocking the water flowing from the water inlet to the water outlet through the water channel, and a flush lever arranged to move the relief valve at a position that the water is allowed to flow to the water outlet for completing the flushing operation of the flush apparatus. Accordingly, the diaphragm is supported within the water cavity that water is pre-filled in the water cavity to generate a predetermined water pressure at the diaphragm. Once the relief valve is moved, the diaphragm is popped to release the water pressure within the water cavity to release the water from the water inlet to the water outlet. Once the diaphragm is returned back to its original position, the water cavity is sealed to re-fill the water therein to re-gain the water pressure. In other words, the water pressure is needed for pushing the diaphragm to seal the water outlet, such that the diaphragm bears the water pressure all the time.

For hygiene purposes, an automatic operated toilet room flush valve is developed. For example, a solenoid operated automatic flush valve, which is battery-operated, utilizes a latching solenoid to limit power drain on the battery. Accordingly, when the infrared sensor detects the presence of a user of a urinal or toilet, the flush valve is automatically driven to open to complete the flushing operation. However, the flush valves have several common drawbacks.

The flush valve must be big enough to provide the water cavity. It is worth mentioning that the diaphragm and the relief valve are disposed in the water cavity. Therefore, the water cavity should be big enough to allow the movements of the diaphragm and the relief valve. In addition, a predetermined volume of the water must be filled in the water cavity to create the water pressure therewithin. Furthermore, the water must be re-filled in the water cavity after every flushing completion.

The flush valve must be incorporated with the diaphragm to retain the water pressure within the water cavity. It is worth mentioning that the diaphragm is made of elastic material such that the diaphragm can be popped to release the water pressure within the water cavity. However, the diaphragm will gradually lose its elasticity and will gradually wear out after the period of usage time and the diaphragm is easily broken or damaged due to the popping movement of the diaphragm. It is recommended that the diaphragm should be replaced every year to keep the flush valve in good working condition. In other words, the service lifespan of the diaphragm is shorter than that of the flush valve, such that the diaphragm must be replaced frequently comparing with other components of the flush valve.

Alternatively, a pistol can be a replacement of the diaphragm to control the flush valve between the opened position and the closed position. In particular, the pistol is moved along the water inflow direction, such that when the pistol is moved against the water inflow direction, the flush valve is moved at the closed position and when the pistol is moved at the water inflow direction, the flush valve is moved at the opened position. In other words, the flush valve must be operated to provide a strong actuating force that is strong enough to move the pistol against the water inflow direction. Accordingly, the conventional flush valve, including the diaphragm or pistol type, bears the water pressure between 20 and 150 psi all the time. In addition, the conventional flush valve is operated to push the diaphragm or the pistol against the water inflow direction from the water source.

The presence of the user sensed by the infrared sensor will cause the solenoid to move the diaphragm to a valve open position. It is known that the solenoid is made of a number of circular wire loops to generate a magnetic force when an electric current is passed through the wire loops. The solenoid may come in contact with water such that the solenoid may accumulate rusting particles from the water, which may remain on the solenoid. It is one of the common problems to cause a failure of operation of the flush valve. In other words, the conventional manual operated flush valve is more reliable than the solenoid operated automatic flush valve. Thus, the maintenance cost of the solenoid operated automatic flush valve is higher than that of the conventional manual operated flush valve.

In addition, the structural design of the solenoid operated automatic flush valve is different from that of the manual operated flush valve. In other words, when the flushing system is incorporated with the solenoid operated automatic flush valve, the flushing system will lose the mechanical-manual operated feature. Therefore, there is no alternative to operate the flushing cycle when the solenoid operated automatic flush valve has failed to operate.

In order to install the solenoid operated automatic flush valve into the conventional flushing system, the mechanical-manual operating mechanism of the flush valve must be totally removed, which is a waste of resources in order to incorporated with the solenoid operated automatic flush valve.

The configuration of the solenoid operated automatic flush valve is complicated, wherein once the solenoid is broken or the battery is dead, the facility should call a technician to open an outer cover and disassemble an inner cover for the replacement of the solenoid or the battery. Due to the complicated structure of the solenoid operated automatic flush valve, the solenoid operated automatic flush valve requires a skilled technician to replace the broken solenoid and/or even replace the battery, which may further increase the maintenance cost of the infrared operated automatic flush valve.

Most of the automatic flush valves cannot adjust each configurations of the flushing cycle to meet the specific requirements. For example, during the baseball game, the toilets in public facility in a baseball stadium need a relatively larger volume of flushing water to keep the toilet empty and clean due to the frequently use of the toilets. Take the restroom in the restaurant for another instance. During the non rush hours, such as in the afternoon, the restaurant may only need smaller amount of flushing water since fewer customers in this period, so as to prevent wasting flushing water.

Therefore, there exists a great need for controlling each of the flushing cycles of the automatic toilet to meet the different requirements and situations of using the automatic toilet.

SUMMARY OF THE PRESENT INVENTION

The invention is advantageous in that it provides an actuation control for the flush apparatus, which comprises a cartridge valve to be selectively actuated between an opened position and a closed position for completing a flushing cycle of the flush apparatus without any requirement of water cavity or diaphragm.

Another advantage of the invention is to provide an actuation control for the flush apparatus, wherein the cartridge valve is orientated transversely, preferably perpendicularly, to the water-in direction that the cartridge valve bears almost no water pressure when the cartridge valve is moved between the opened position and the closed position.

Another advantage of the invention is to provide an actuation control for the flush apparatus, which generates power torque as the actuation force to actuate the cartridge valve, such that the cartridge valve is able to control a high water pressure from the water source.

Another advantage of the invention is to provide an actuation control for the flush apparatus, wherein since the flush apparatus does not contain any water cavity or diaphragm, the size of the flush apparatus can be minimized to be installed into the flush system.

Another advantage of the invention is to provide an actuation control for the flush apparatus, which is capable of effectively controlling a flow volume of flush water during a flushing operation.

Another advantage of the invention is to provide an actuation control for the flush apparatus, which is reliable and that can be easily installed and maintained.

Another advantage of the invention is to provide an actuation control for the flush apparatus, which is powered by an electric motor to selectively actuate the cartridge valve between the opened condition and the closed condition.

Another advantage of the invention is to provide an actuation control for the flush apparatus, wherein the electric motor is used as the power generator to avoid water damage and to enhance performance and reliability.

Another advantage of the invention is to provide an actuation control for the flush apparatus, which provides an economic and efficient solution for incorporating with the conventional flush system in a simple and economical way.

Another advantage of the invention is to provide an actuation control for the flush apparatus, wherein the power source is automatically re-charged via a charging arrangement every time during the flushing operation of the flush apparatus.

Another object of the present invention is to provide an actuation control for the flush apparatus, which does not require to alter the original structural design of the flush apparatus, so as to minimize the manufacturing cost of the flush apparatus incorporating with the actuation control.

Another object of the present invention is to provide an actuation control for the flush apparatus, wherein no expensive or complicated structure is required to employ in the present invention in order to achieve the above mentioned objects. Therefore, the present invention successfully provides an economic and efficient solution for not only providing the cartridge valve to incorporate with a water-cavity-less and diaphragm-less configuration of the flush apparatus but also providing an accurate and simple flush operation via the rotatable movement of the sealing disc.

Additional advantages and features of the invention will become apparent from the description which follows, and may be realized by means of the instrumentalities and combinations particular point out in the appended claims.

According to the present invention, the foregoing and other objects and advantages are attained by a diaphragm-less flush apparatus for a flush system, comprising a valve body and an actuation control.

The valve body has a water inlet for connecting to a water source to guide water to flow to the water inlet at a water-in direction, and a water outlet for connecting to the flush system.

The actuation control comprises a sensor for detecting a presence of a user of the flushing system, a cartridge valve, and a power generator.

The cartridge valve comprises a cartridge housing stationary supported in the valve body at a position that a valve inlet of the cartridge housing is located at the water inlet and the valve outlet of the cartridge housing is located at the water outlet, and a control disc unit which is supported in the cartridge housing at the valve inlet thereof and is orientated perpendicular to the water-in direction for biasing against water pressure from the water source, wherein the control disc unit is driven to move between a closed position to close the valve inlet for blocking the water to pass through the valve inlet, and an opened position to open up the valve inlet for allowing the water passing to the water outlet through the valve outlet so as to complete a flushing cycle of the flush system.

The power generator is activated by the sensor and is operatively linked to the cartridge valve to drive the control disc unit between the closed position and the opened position.

In accordance with another aspect of the invention, the present invention comprises an actuation control for controlling volume of water used in a flushing cycle of a flush system, comprising:

a cartridge valve being actuated between an opened position and a closed position to compete the flushing cycle, wherein the cartridge valve comprises a cartridge housing having a valve inlet for communicating with a water source and the valve outlet for guiding water to flow to the flush system, and a control disc unit which is supported in the cartridge housing at the valve inlet thereof and is orientated perpendicular to a water-in direction of the water for biasing against water pressure from the water source, wherein the cartridge valve is actuated at the closed position to close the valve inlet by the control disc unit for blocking the water to pass through the valve inlet, and at the opened position to open up the valve inlet for allowing the water passing to the valve outlet so as to complete the flushing cycle of the flush system; and a control processor operatively linked to the cartridge valve for controllably adjusting a time of the flushing cycle and water volume for the flushing cycle, wherein the control processor is activated in responsive to a presence of a user of the flush system to actuate the cartridge valve for controllably adjusting the time of the flushing cycle by moving the cartridge valve between the closed position and the opened position.

In accordance with another aspect of the invention, the present invention comprises a method of controlling a flushing cycle of a flush system via a diaphragm-less flush apparatus which comprises a valve body having a water inlet and a water outlet, comprising the following steps.

(1) Support a cartridge housing of a cartridge valve in the valve body by the following steps.

(1.1) Align a valve inlet of the cartridge housing with the water inlet which is connected to a water source.

(1.2) Align a valve outlet of the cartridge housing with the water outlet.

(1.3) Support a sealing disc of the cartridge valve in the cartridge housing at the valve inlet at a position that the sealing disc is orientated perpendicular to a water-in direction of a flow of water for biasing against water pressure from the water source.

(2) Retain the cartridge valve in a closed position that the valve inlet is sealed and closed by the sealing disc.

(3) In responsive to a presence of a user, activate a power generator to actuate the cartridge valve from the closed position to an opened position that the sealing disc is moved to open up the valve inlet.

(4) After completing the flushing cycle of the flush system, automatically activate the power generator to actuate the cartridge valve back to the closed position from the opened position that the sealing disc is moved to seal and close the valve inlet.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
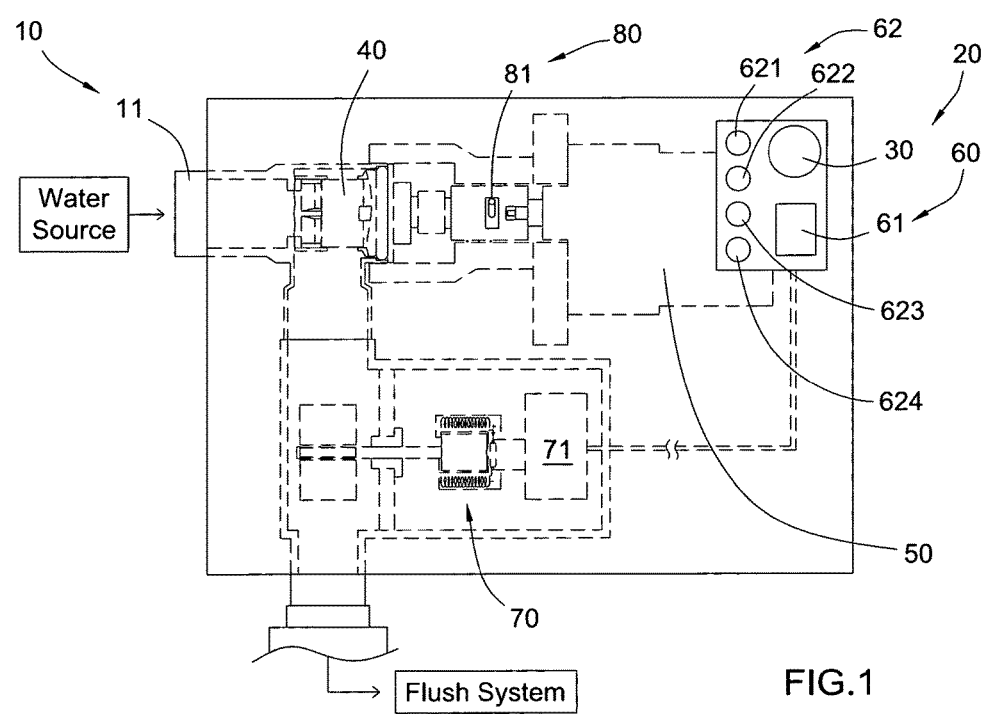
FIG. 1 is a front view of a flush apparatus for a flush system according to a preferred embodiment of the present invention, illustrating a closed position of a cartridge valve.
Figure 2:
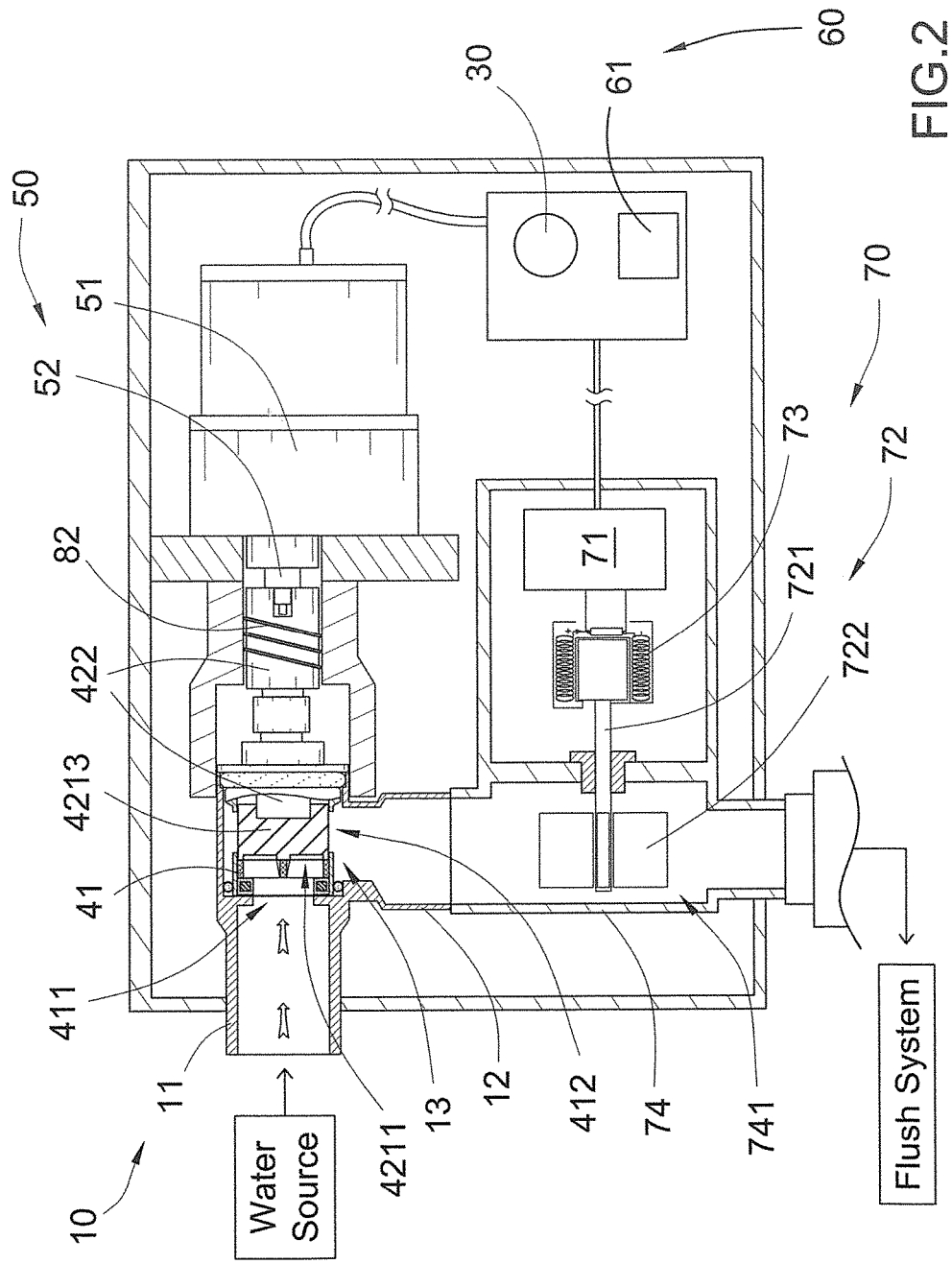
FIG. 2 is a sectional view of a flush apparatus for a flush system according to the above preferred embodiment of the present invention, illustrating a closed position of a cartridge valve.
Figure 3:
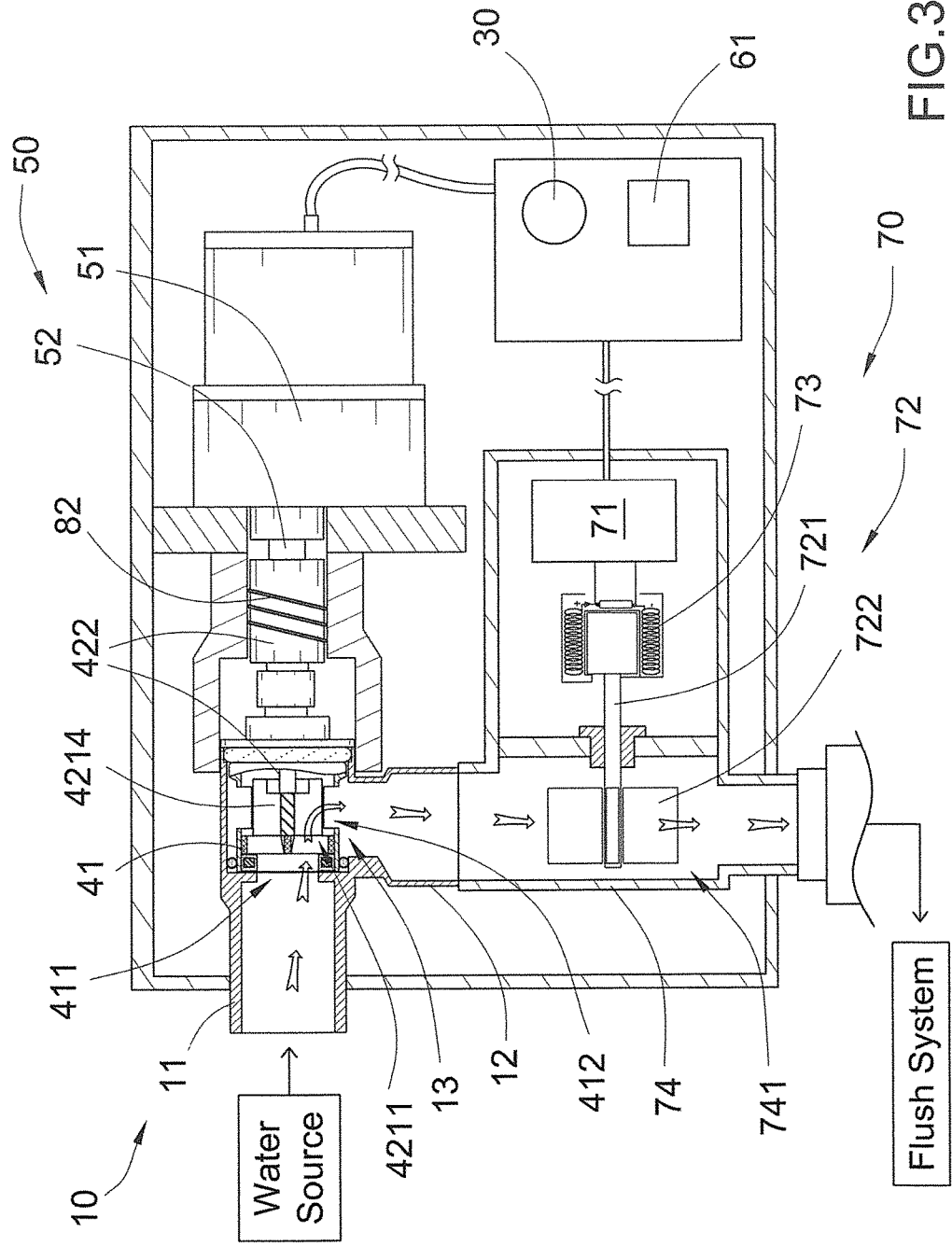
FIG. 3 is a sectional view of the flush apparatus for the flush system according to the above preferred embodiment of the present invention, illustrating an opened position of the cartridge valve.

Referring FIGS. 1 to 3 of the drawings, a flush apparatus for a flush system according to a preferred embodiment of the present invention is illustrated, wherein the flush apparatus is a diaphragm-less flush apparatus that no diaphragm, no water gasket, or any elastic film is used in the flush apparatus to retain a predetermined water pressure. In other words, no water will be pre-filled in the flush apparatus to create the water pressure therein. Therefore, no water cavity is formed in the flush apparatus of the present invention. According to the preferred embodiment, the flush apparatus comprises a valve body 10 and an actuation control 20. It is worth mentioning that the flush system can be a urinal or a toilet bowl.

The valve body 10 has a water inlet 11 for connecting to a water source to guide water to flow to the water inlet 11 at a water-in direction, and a water outlet 12 for connecting to the flush system. Accordingly, when the water is guided to flow from the water inlet 11 to the flush system through the water outlet 12 to complete a flushing cycle of the flush system. The valve body 10 further has a cartridge cavity 13 formed between the water inlet 11 and the water outlet 12. It is worth mentioning that no water is pre-filled in the cartridge cavity 13.

The actuation control 20 comprises a sensor 30, a cartridge valve 40, a power generator 50, a control processor 60, and a power charging arrangement 70.

The sensor 30, such as an infrared sensor, is supported by the valve body 10 and is arranged to detect the presence of a user by means of infrared signal in such a manner that the sensor 30 transmits an infrared signal for detecting the presence of the user of the flush system.

The cartridge valve 40 is supported in the cartridge cavity 13 of the valve body 10 to selectively guide the water to flow from the water inlet 11 to the water outlet 12. As shown in FIGS. 2 to 4 and 6, the cartridge valve 40 comprises a cartridge housing 41 stationary supported in the cartridge cavity 13 of the valve body 10 and a control disc unit 42 supported in the cartridge housing 41.

According to the preferred embodiment, the cartridge valve 40 is actuated between an opened position and a closed position to compete the flushing cycle. The flushing cycle refers to the cartridge valve 40 being actuated from the closed position to the opened position and back to the closed position. The cartridge housing 41 has a valve inlet 411 for communicating with a water source and a valve outlet 412 for guiding water to flow to the flush system. The control disc unit 42 is supported in the cartridge housing 41 at the valve inlet 411 thereof and is orientated transversely, preferably perpendicular, to a water-in direction of the water for resisting water pressure from the water source. It is worth mentioning that the cartridge valve 40 bears almost no water pressure when the cartridge valve 40 is moved between the opened position and the closed position.

The cartridge valve 40 is actuated at the closed position to close the valve inlet 411 by the control disc unit 42 for blocking the water to pass through the valve inlet 411, and at the opened position to open up the valve inlet 411 for allowing the water passing to the valve outlet 412 so as to complete the flushing cycle of the flush system.

In particular, the valve inlet 411 is located at and coaxially aligned with the water inlet 11 of the valve body 10 and the valve outlet 412 is located at and coaxially aligned with the water outlet 12 of the valve body 10. Therefore, when the water passes through the water inlet 11 to the water outlet 12, the water must pass through the valve inlet 411 to the valve outlet 412 of the cartridge housing 41.

In one embodiment, the cartridge housing 41 has a tubular surrounding wall 413 defining an open end and a closed end, wherein the valve inlet 411 is formed at the open end of the surrounding wall 413 and the valve outlet 412 is formed at the surrounding wall 413 between the open end and the closed end.

The control disc unit 42 is supported in the surrounding wall 413 of the cartridge housing 41 and is orientated transverse, preferably perpendicular, to the water-in direction of the water flowing at the valve inlet 411, i.e. the water-in direction at the water outlet 12, for resisting water pressure from the water source. Accordingly, the control disc unit 42 is driven to move between the closed position, as shown in FIG. 2, to close the valve inlet 411 for blocking the water to pass through the valve inlet 411, and the opened position, as shown in FIG. 3, to open up the valve inlet 411 for allowing the water passing to the water outlet 12 through the valve outlet 412 so as to complete the flushing cycle of the flush system.

Figure 4:
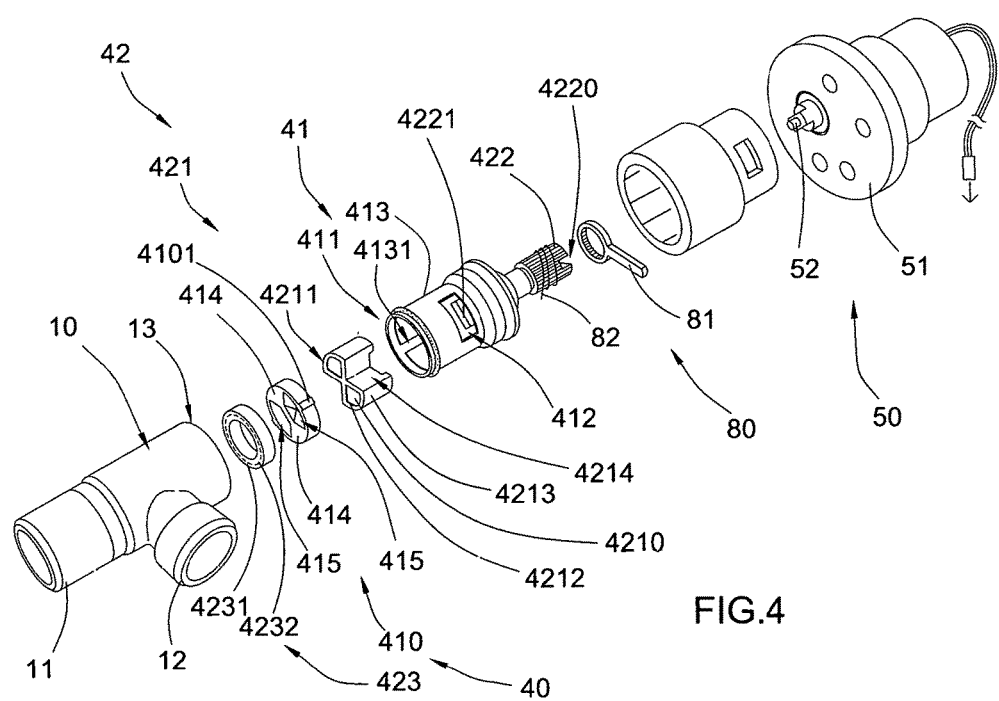
FIG. 4 is an exploded perspective view of the cartridge valve of the flush apparatus for the flush system according to the above preferred embodiment of the present invention.

As shown in FIGS. 2 to 4, the control disc unit 42 comprises a sealing disc 421 rotatably coupled within the surrounding wall 413 at the open end thereof to selectively close the valve inlet 411, and a control shaft 422 extended from the sealing disc 421 through the closed end of the surrounding wall 413 to operatively couple with the power generator 50 so as to drive the sealing disc 421 to rotate between the closed position and the opened position. Preferably, the sealing disc 421 is made of ceramic or other durable material such as platinum.

The sealing disc 421 has a flat pressuring surface 4211 perpendicular to the water-in direction at the valve inlet 411 for resisting water pressure from the water source. For example, when the water-in direction at the valve inlet 411 refers to the water passing at the valve inlet 411 at the horizontal direction, the flat pressuring surface 4211 of the sealing disc 421 is vertically supported to withstand the water pressure from the water source. It is worth mentioning that the water pressure is created from the water source but not within the valve body 10 or the cartridge valve 40.

As shown in FIG. 4, the control disc unit 42 further comprises a stationary disc 410, having a plurality of valve sectors 414, sealed at the open end of the surrounding wall 413 to define a plurality of opening sectors 415 alternating with the valve sectors 414, such that the control disc unit 42 is moved at the closed position when the sealing disc 421 is rotated to close the opening sectors 415. In other words, the opening sectors 415 are uncovered when the control disc unit 42 is moved at the opened position to allow the water entering through the opening sectors 415. Accordingly, the valve sectors 414 are radially extended from a center of the surrounding wall 413 to a peripheral edge thereof. In one embodiment, two valve sectors 414 are formed at the open end of the surrounding wall 413 and two opening sectors 415 are defined at the open end of the surrounding wall 413. Preferably, an area of each valve sector 414 is larger than an area of the opening sector 415.

Figure 5:
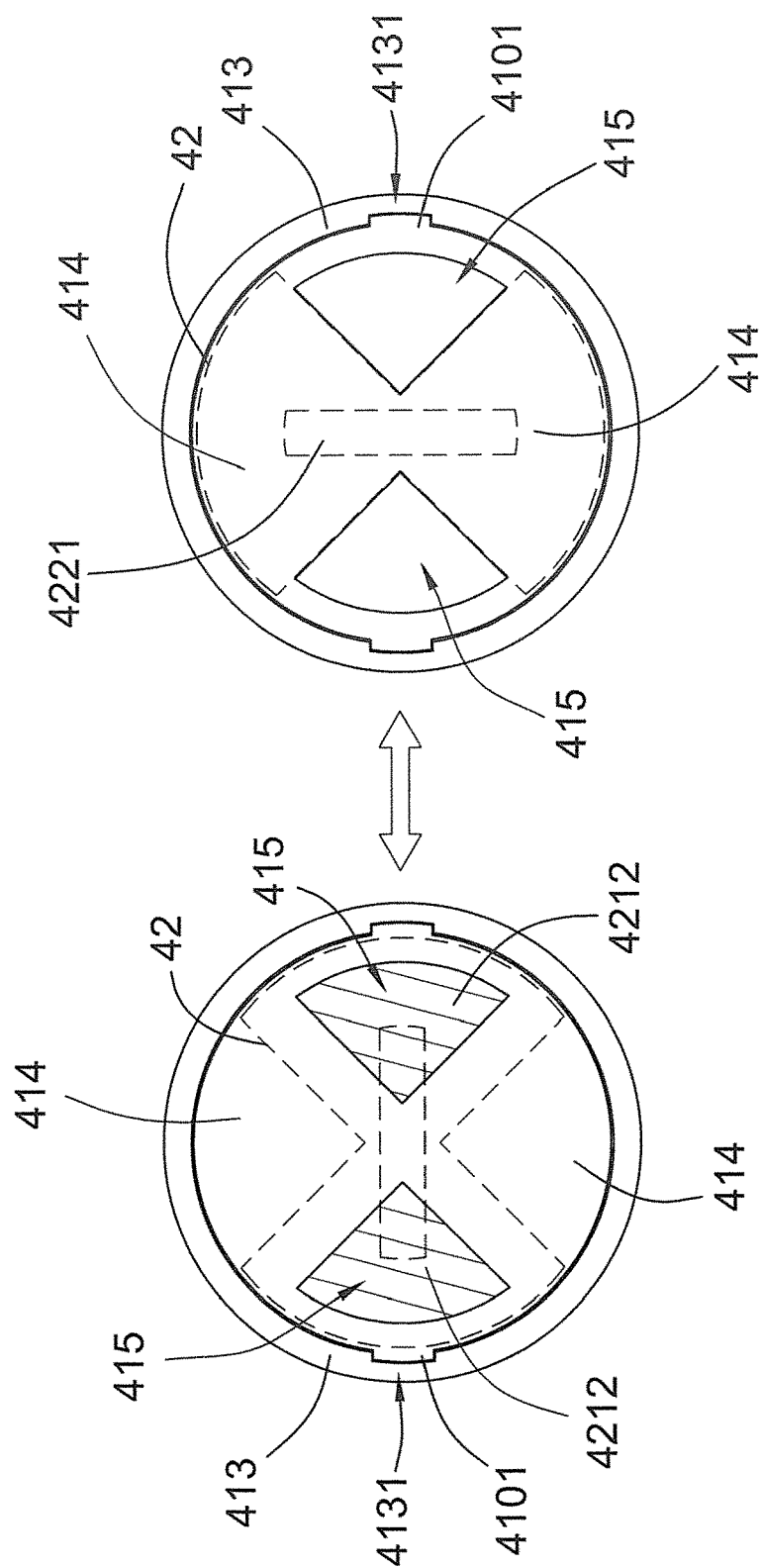
FIG. 5 is a side view of the of the flush apparatus for the flush system according to the above preferred embodiment of the present invention, illustrating the cartridge valve being actuated between the closed position and the opened position.
Figure 6:
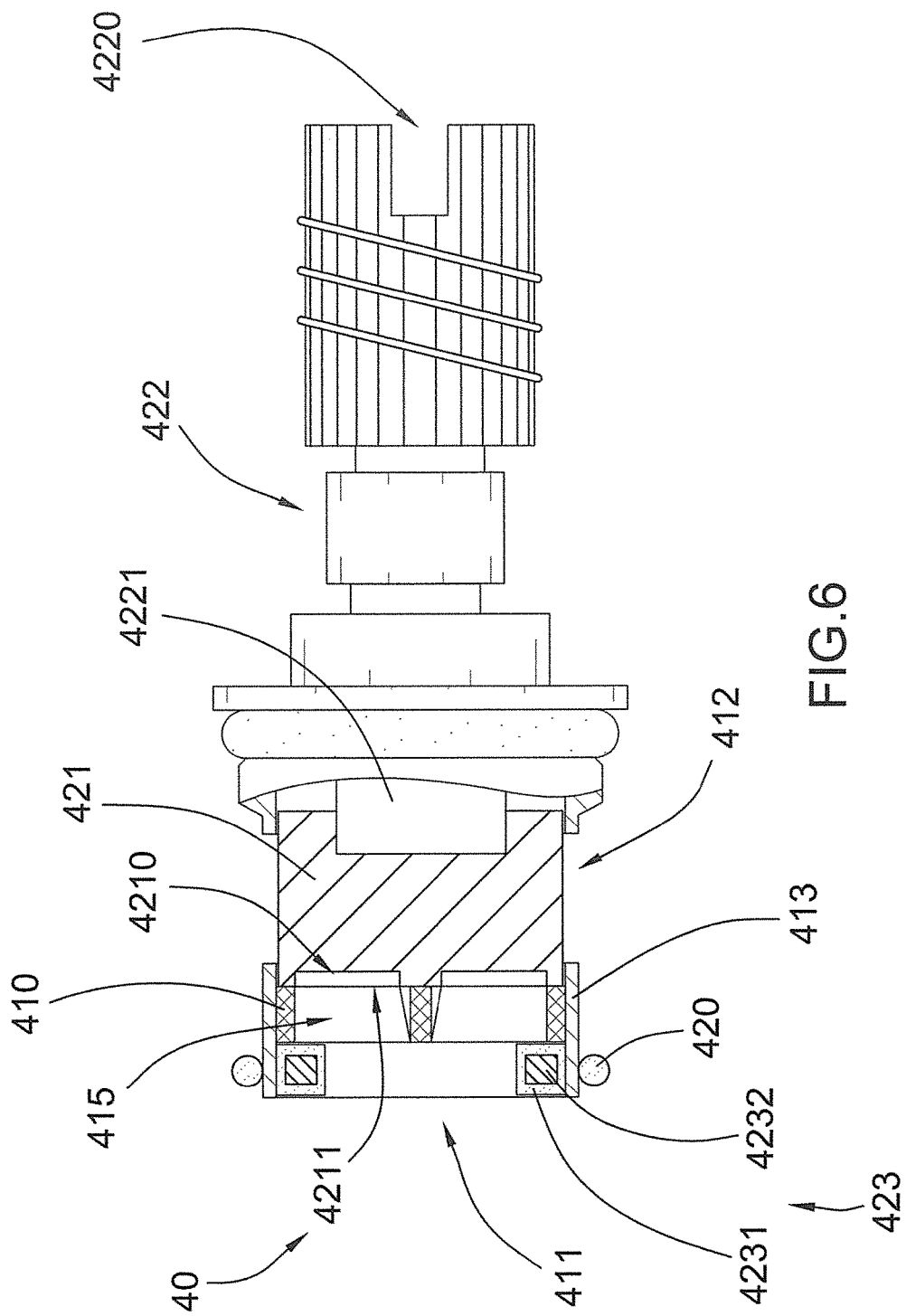
FIG. 6 is a sectional view of the cartridge valve of the flush apparatus for the flush system according to the above preferred embodiment of the present invention.

The sealing disc 421 comprises a plurality of disc sectors 4212 corresponding to the valve sectors 414, wherein the flat pressuring surface 4211 is defined on each of the disc sectors 4211. Accordingly, when the sealing disc 421 is rotated to align the disc sectors 4211 with the valve sectors 414 respectively, the opening sectors 415 are opened for allowing the water to pass through, and when the sealing disc 421 is rotated to align the disc sectors 4212 with the opening sectors 415 respectively, the opening sectors 415 are sealed and closed for blocking the water to pass through. Accordingly, the area of each of the disc sectors 4212 is at least the same as the area of the valve sector 414, such that the disc sector 4212 is big enough to cover and seat at the opening sector 415. As shown in FIG. 5, when the sealing disc 421 is rotated at one direction, the disc sectors 4212 are moved to align with the valve sectors 414, such that the opening sectors 415 are opened up to allow the water to flow into the valve inlet 411 to start the flush operation. When the sealing disc 421 is rotated at an opposite direction, the disc sectors 4212 are moved to align with and seal at the opening sectors 415, such that the flat pressuring surfaces 4211 of the disc sectors 4212 will block the water to flow into the valve inlet 411. It is worth mentioning that the rotational direction of the sealing disc 421 is perpendicular to the water-in direction of water at the water inlet 11.

Accordingly, the stationary disc 410 and the sealing disc 421 are made of ceramic material, wherein the stationary disc 410 and the sealing disc 421 are biased against each other. In other words, the inner surface of the stationary disc 410 is engaged with the outer surface, i.e. the flat pressuring surface 4211, of the sealing disc 421. It is worth mentioning that the two surfaces of the stationary disc 410 and the sealing disc 421 are coupled with each other via a mutual attractive force. In addition, due to the ceramic material, the sealing disc 421 is driven to rotate with almost frictionless to the stationary disc 410. In order to overcome the attractive force between the stationary disc 410 and the sealing disc 421 to enhance the rotational movement of the sealing disc 421 with respect to the stationary disc 410, the sealing disc 421 further has a plurality of indentions 4210 formed at the disc sectors 4212 to minimize the contacting surface engagement between the stationary disc 410 and the sealing disc 421. Therefore, the attractive force is strong enough to retain the positioning relationship between the sealing disc 421 and the stationary disc 410 and is weak enough to allow the sealing disc 421 to smoothly rotate with respect to the stationary disc 410.

The sealing disc 421 further comprises a plurality of disc arms 4213 extended from the disc sectors 4212 respectively with the surrounding wall 413 and a plurality of disc openings 4214 formed between two of the disc arms 4213. When the sealing disc 421 is rotated at one direction to align the disc sectors 4212 align with the valve sectors 414, at least one of the disc openings 4214 is aligned with the valve outlet 412 to allow the water to flow out of the valve outlet 412. When the sealing disc 421 is rotated at an opposite direction to align and seal the disc sectors 4212 at the opening sectors 415, at least one of the disc arms 4213 is aligned with and sealed at the valve outlet 412 to block the water to flow out of the valve outlet 412. In other words, the sealing disc 421 is rotated to seal and block the valve inlet 411 by the disc sectors 4212 and to seal and block the valve outlet 412 by the disc arm 4213 to ensure no water to be flow from the water inlet 11 to the water outlet 12.

The control shaft 422 is coaxially extended from the sealing disc 421 to drive the sealing disc 421 to rotate. In particular, the control shaft 422 is operatively coupled to the power generator 50. It is worth mentioning that the control shaft 422 has a driving end 4221 extended into the closed end of the surrounding wall 413 to drive the sealing disc 421 to rotate, and a driven end extended out of the closed end of the surrounding wall 413 to detachably couple with the power generator 50. Therefore, in case of the malfunction of the cartridge valve 40, the cartridge valve 40 can be removed from the valve body 10 and a new cartridge valve 40 can be replaced to be installed into the valve body 10. In particular, the sealing disc 421 has an engaging slot formed at a rear side thereof to engage with the driving end of the control shaft 422. Accordingly, the engaging slot is an elongated slot indented on the rear side of the sealing disc 421 to engage with the driving end of the control shaft 422, such that when the driven end of the control shaft 422 is rotated by the power generator 50, the sealing disc 421 is driven to rotate within the surrounding wall 413.

In order to prevent the rotational movement of the stationary disc 410 within the surrounding wall 413, the surrounding wall 413 further has at least a positioning slot 4131 formed at an inner wall surface of the surrounding wall 413. The stationary disc 410 further comprises at least a positioning protrusion 4101 radially and outwardly protruded therefrom, such that when the stationary disc 410 is coaxially received in the surrounding wall 413, the positioning protrusion 4101 is received at the positioning slot 4131 to prevent the stationary disc 410 from being rotated within the surrounding wall 413.

As shown in FIG. 4, the control disc unit 42 further comprises a sealing unit 423. The sealing unit 423 comprises a sealing gasket 4231 having a ring shape sealed at the open end of the surrounding wall 413 to prevent the stationary disc 410 from being slid out of the surrounding wall 413 through the open end thereof. The sealing unit 423 further comprises a retention ring 4232 coaxially coupled at the sealing gasket 4231 to retain the shape of the sealing gasket 4231. It is worth mentioning that the sealing gasket 4231 is made of sealing material such as rubber, and the retention ring 4232 is made of metal. When the water flows into the open end of the surrounding wall 413, the water pressure will bias against the stationary disc 410 and the sealing disc 421, such that once the cartridge valve 40 is installed, the stationary disc 410 and the sealing disc 421 cannot be accidentally detached from the surrounding wall 413. Preferably, the control disc unit 42 further comprises a sealing ring 420 coaxially coupled at an outer circumferential surface of the surrounding wall 413 to seal with the inner wall of the water inlet 11.

The power source 50, which is a non-solenoid unit, comprises an electric motor 51 for generating a rotational power and an output shaft 52 operatively extended from the electric motor 51 to couple with the control shaft 422 of the cartridge valve 40 so as to rotatably drive the control disc unit 42 between the closed position and the opened position. It is worth to mention that the electric motor 51 is preferred and is more reliable than the solenoid because the electric motor 51 provides simple mechanical work rather than using the magnetic force, so as to minimize the failure operation of the electric motor 51 and to reduce the maintenance cost of the present invention. In addition, the size of the electric motor 51 is so small in comparison with the solenoid so as to reduce the overall size of the electric motor 51. Therefore, the electric motor 51 is preferred to be used to not only ensure the reliable of the electric motor 51 but also enhance the smooth operation thereof. It is worth mentioning that the output shaft 52 is detachably coupled at the driven end of the control shaft 422 to directly transmit the rotational power from the electric motor 51 to the control shaft 422 through the output shaft 52.

Figure 7:
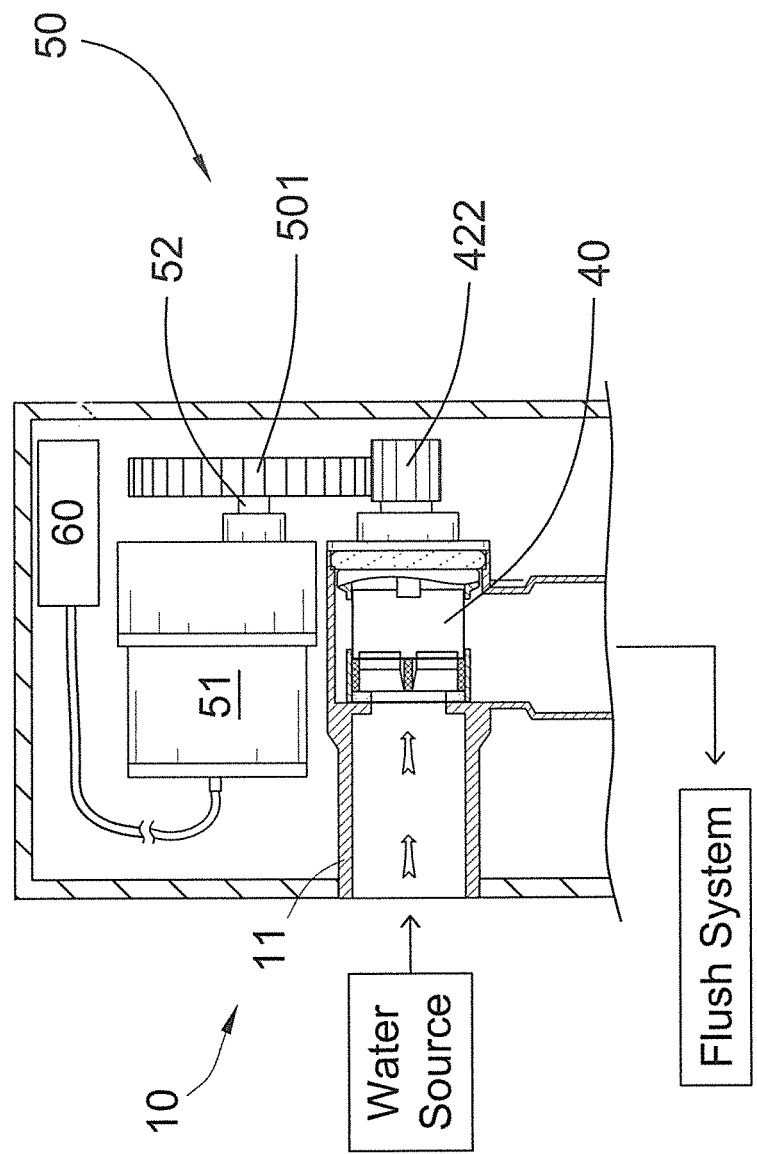
FIG. 7 illustrates an alternative mode of the electric motor of the flush apparatus for the flush system according to the above preferred embodiment of the present invention.

As shown in FIGS. 2 to 4, the electric motor 51 is located at a side of the cartridge valve 40, wherein the output shaft 52 is aligned with and coupled at the control shaft 422 end-to-end. Preferably, the control shaft 422 has a coupling slot 4220 formed at the driven end thereof, wherein the output shaft 52 is extended to engage with the coupling slot of the control shaft 422 so as to couple the output shaft 52 with the control shaft 422 end-to-end. It is appreciated that the electric motor 51 is located above the cartridge valve 40, as shown in FIG. 7, wherein the output shaft 52 is coupled at the control shaft 422 via a gear mechanism 501, such that the rotational power from the output shaft 52 can be transmitted to the control shaft 422 via the gear mechanism.

The control processor 60 is operatively linked to the power generator 50 for controllably adjusting a time of the flushing cycle and water volume for the flushing cycle, wherein the control processor 60 is activated in response to a presence of a user of the flushing system to actuate the cartridge valve 40 for controllably adjusting the time of the flushing cycle by moving the cartridge valve 40 between the opened position and the closed position.

The control processor 60 comprises a processor unit 61 operatively linked to the sensor 30 to receive the signal therefrom and operatively linked to the electric motor 51 of the power generator 50 to activate the electric motor 51 in response to the signal. Accordingly, when the sensor 30 detects the presence of the user of the flush system, the sensor 30 will generate a first actuation signal to the processor unit 61. Once the processor unit 61 receives the first actuation signal, the processor unit 61 will activate the electric motor 51 to generate the rotational power to drive the cartridge valve 40 from the closed position to the opened position. Then, the processor unit 61 will re-activate the electric motor 51 to generate the rotational power to drive the cartridge valve 40 back to the closed position from the opened position. Accordingly, the processor unit 61 will re-activate the electric motor 51 when the sensor 30 detects the absence of the user of the flush system. For example, the user leaves the flush system that the user is out of the detecting range of the sensor 30. The sensor 30 will generate a second actuation signal to the processor unit 61. Once the processor unit 61 receives the second actuation signal, the processor unit 61 will re-activate the electric motor 51 to drive the cartridge valve 40 back to the closed position from the opened position. Alternatively, the processor unit 61 will re-activate the electric motor 51 after a predetermined of time usage, such as 30 seconds. In other words, the electric motor 51 will be re-activated 30 seconds after the processor unit 61 receives the first actuation signal. It is worth mentioning that when the electric motor 51 is re-activated, the rotational direction of the rotational power generated by the electric motor 51 can be the same as the rotational direction of the rotational power generated by the electric motor 51 when the electric motor 51 is activated initially. In particular, the control processor 60 will control the rotational displacement of the sealing disc 421. In one embodiment, the sealing disc 421 is driven to rotate from 0 degree. (closed position) to 90° (opened position) and is then to rotate from 90° (opened position) to 180° (closed position) to complete one flushing cycle. For next cycle, the sealing disc 421 is driven to rotate from 180° (closed position) to 270° (opened position) and is then to rotate from 270° (opened position) to 360° (closed position), i.e. back to 0° (closed position). Likewise, the control processor 60 can control the rotational displacement of the sealing disc 421 by driving the sealing disc 421 to rotate from 0° (closed position) to 180° (opened position) and is then to rotate from 180° (opened position) to 360° (closed position) to complete one flushing cycle. It is worth mentioning that the rotational direction of the rotational power can be reversibly generated by the electric motor 51 that the electric motor 51 is generated the forward rotational power to drive the cartridge valve 40 from the closed position to the opened position and the reversed rotational power to drive the cartridge valve 40 back to the closed position from the opened position. For example, the sealing disc 421 is driven to rotate from 0 degree. (closed position) to 90° (opened position) and is then to rotate from 90° (opened position) back to 0° (closed position) to complete one flushing cycle.

As it is mentioned above, the control processor 60 is operatively linked to the power generator 50 for controllably adjusting the time of the flushing cycle. In particular, the processor unit 61 of the control processor 60 controllably adjusts a time of the cartridge valve 40 staying at the opened position, such that the control processor 60 delays the time of the cartridge valve 40 staying at the opened position for increasing the water volume of the flushing cycle. In other words, by increasing the time of the cartridge valve 40 staying at the opened position, the water volume for the flushing cycle will be increased.

Alternatively, the control processor 60 controls a rotational speed of the output shaft 52 for controllably adjusting the volume of water used in the flushing cycle for the flush system. In particular, the control processor 60 will control the rotational power of the electric motor 51. When the rotational speed of the output shaft 52 is reduced, the sealing disc 421 will rotate slowly. In other words, the cartridge valve 40 will take longer time to move from the closed position to opened position and back to the closed position. As a result, the water volume for the flushing cycle will be increased.

The control processor 60 further comprises a configuration setting arrangement 62 operatively linked to the processor unit 61 to configure different volume settings. As shown in FIG. 1, the configuration setting arrangement 62 comprises a high volume control 621 and a low volume control 622 for selectively adjusting the volume of water used in the flushing cycle for the flush system. Accordingly, the high volume control 621 and the low volume control 622 are configured as two buttons that when the high volume control button is pressed, the processor unit 61 is configured to control the flushing cycle for the flush system with relatively high volume of water. Likewise, when the low volume control button is pressed, the processor unit 61 is configured to control the flushing cycle for the flush system with relatively low volume of water.

The configuration setting arrangement 62 further comprises an override control 623 that activates the processor unit 61 to directly activate the power generator 50. The override control 623 is configured as a button that when the override control button is pressed, the processor unit 61 will activate the power generator 50 to move the cartridge valve 40 from the closed position to the opened position. In other words, when the override control button is pressed, the flush operation is automatically started to flush the flush system, such that the override control 623 serves as a manual flush button to manually flush the flush system, especially when the sensor 30 is disabled or malfunctioned.

The configuration setting arrangement 62 further comprises a time interval control 624 to self-start the flushing cycle every predetermined time interval that is adjustably controlled in a timely manner. The time interval control 624 comprises a time control panel to program a flush program of the processor unit 61. It is worth mentioning that the actuation control of the present invention can be configured in a normal flush mode that the flush operation is started in response to the presence of the user via the sensor 30, and in a timer flush mode that the flush operation is started in response to the time interval. Through the time control 624, the cartridge valve will be actuated for every preset time interval. For example, the time interval can be preset to one hour, every two, four, six, twelve, or twenty four hours respectively via the time interval control 624 for starting the flushing cycle, in such a manner that a manager, such as a cleaner of a public lavatory, is able to controllably select the time intervals of the flushing configuration regarding to variety circumstances, such as during rush hours and off rush hours. In other words, during the rush hours, the time interval control 624 is configured to actuate the flush apparatus frequently, and during the off rush hours, the time interval control 624 is configured to actuate the flush apparatus seldom. It is worth mentioning that when the actuation control is set in the timer flush mode, the sensor 30 will be automatically deactivated because the flush operation will be started via the time interval but not the sensor 30.

The power charging arrangement 70 comprises a power source 71 electrically linked to the power generator 50, a propeller unit 72 located at the water outlet 12, and an electrical generator 73 operatively linked between the propeller unit 72 and the power source 71, such that when the propeller unit 72 is driven to rotate in response to a flush of the water coming out at the water outlet 12, the electrical generator 73 is actuated to charge the power source 71.

According to the preferred embodiment, the power source 71 is a rechargeable battery supported in the valve body 10. Alternatively, the power source 71 can be a power outlet electrically linking with an external AC power supply or a solar energy collector for converting solar energy into electrical energy to supply the power to the electric motor 51.

The propeller unit 72 comprises a propeller shaft 721 transversely extended with respect to the water outlet 12 and a propeller blade 722 coupled at a free end of the propeller shaft 721 at the water outlet 12 such that the propeller blade 722 is driven to be rotated in response to the flush of water so as to transmit a rotational power to the electrical generator 73 through the propeller shaft 721. In other words, the propeller unit 72 translates water flush energy to the rotational torque directly related to the total blade area, i.e. more blades equal more torque. Multiple propeller blades 722 contain a greater surface area on the propeller blades 722 allowing a small diameter propeller size to be effective.

The electrical generator 73, according to the preferred embodiment, is an alternator or a DC generator converting mechanical energy (rotational force) of the propeller unit 72 to the electrical energy. Accordingly, a rectifier can be used to convert AC current to DC current if the alternator is used.

Preferably, the power charging arrangement 70 further comprises a charging housing 74 having a water guiding channel 741 connected to the water outlet 12, wherein the propeller blade 722 is supported at the water guiding channel 741. Accordingly, the power source 71 and the electrical generator 73 are received in the charging housing 74.

The actuation control 20 further comprises a manual flush actuator 80 comprises a manual switch 81 coupled at the cartridge valve 40 to manually drive the cartridge valve 40 from the closed position to the opened position. Accordingly, the manual switch 81 is coupled at the control shaft 422, such that when the manual switch 81 is manually actuated, such as pivotally actuated, the control shaft 422 is driven to rotate to move the cartridge valve 40 from the closed position to the opened position. The manual flush actuator 80 further comprises a resilient element 82 coupled at the manual switch 81 to apply an urging force thereto for moving the manual switch 81 back to its original position after the manual actuation. Preferably, the resilient element 82 can be a coil spring coaxially coupled at the control shaft 422 to bias against the manual switch 81, such that when the manual switch 81 is pivotally pressed as an example, the resilient element 82 will be compressed. When the manual switch 81 is released, the resilient element 82 will push the manual switch 81 back to the original position. It is appreciated that the resilient element 82 can be coaxially coupled at the output shaft 52 of the power generator 50 because the control shaft 422 is coupled to the output shaft 52 and is driven to rotate by the output shaft 52.

It is worth mentioning that each of the manual flush actuator 80 and the override control 623 can be manually actuated by the user to flush the flush system. Therefore, the user is able to clean the flush system and flush the flush system thereafter. Accordingly, the conventional flush apparatus requires a water tank to refill the water therein, such that after completing the flush operation, the flush system requires to a certain time to refill the water in the water tank for next flush operation. Since the flush apparatus of the present invention directly controls the water via the cartridge valve 40, no water tank is required. Therefore, the user is able to flush the flush system consequently without any water refilling wait time.

The present invention further provides a method of controlling the flushing cycle of the flush system via the flush apparatus, comprising the following steps.

(1) Support the cartridge housing 41 of the cartridge valve 40 in the valve body 10 by the following steps.

(1.1) Align the valve inlet 411 of the cartridge housing 41 with the water inlet 11 which is connected to the water source. Preferably, the valve inlet 411 is coaxially located within the water inlet 11 of the valve body 10.

(1.2) Align the valve outlet 412 of the cartridge housing 41 with the water outlet 12. Preferably, the valve outlet 412 is coaxially located within the water outlet 12 of the valve body 10.

(1.3) Support the sealing disc 421 of the cartridge valve 40 in the cartridge housing 41 at the valve inlet 411 at a position that the sealing disc 421 is orientated perpendicular to the water-in direction of the flow of water for biasing against water pressure from the water source.

(2) Retain the cartridge valve 40 in the closed position that the valve inlet 411 is sealed and closed by the sealing disc 421.

(3) In response to a presence of a user, activate the power generator 50 to actuate the cartridge valve 40 from the closed position to the opened position that the sealing disc 421 is moved to open up the valve inlet 411.

(4) After completing the flushing cycle of the flush system, automatically activate the power generator 50 to actuate the cartridge valve 40 back to the closed position from the opened position that the sealing disc 421 is moved to seal and close the valve inlet 411. It is worth mentioning that the sealing disc 421 is rotatably supported in the cartridge housing 41, such that the sealing disc 421 is rotated at one direction to open up of the valve inlet 411 and is rotated at an opposed direction to close the valve inlet 411.

According to the preferred embodiment, during the flush operation, the method further comprises a water volume control step and a power charging step.

The water volume control step is a pre-step for controllably adjusting a time of the flushing cycle and water volume for the flushing cycle via the control processor 60 which is operatively linked to the power generator 50. Accordingly, the control processor 60 controllably adjusts the time of the cartridge valve 40 staying at the opened position, such that the control processor 60 delays the time of the cartridge valve 40 staying at the opened position for increasing the water volume of the flushing cycle. Likewise, the control processor 60 controllably adjusts the rotational speed of the sealing disc 421 between the opened position and the closed position.

The power charging step comprises the following steps.

(A) Electrically link the power source 71 to the power generator 50.

(B) Support the propeller unit 72 at the water outlet 12 for being driven to rotate in response to a flush of the water coming out at the water outlet 12.

(C) Operatively link the electrical generator 73 between the propeller unit 72 and the power source 71 to convert the mechanical energy from the propeller unit into the electrical energy to be stored in the power source 71.

The flush apparatus of the present invention is capable of incorporating with most conventional flushing systems to provide the sensor operation of the flushing system with or without the flush lever for starting the flushing cycle. It is worth to mention that the cartridge valve 40 can be embodied as the valve body 10 to further reduce the overall size of the flush apparatus.

The installation of the flush apparatus can be simple and easy by the steps of removing the conventional flush apparatus and attaching the flush apparatus of the present invention to the flush system. When the flush apparatus can be incorporated with the sensor type flush apparatus, the control processor 60 will be programmed to either the normal flush mode or the timer flush mode. When the cartridge valve 40 is broken or damaged, the user is able to remove the broken cartridge valve 40 from the valve body 10 and to replace a new cartridge valve 40 to the valve body 10, such that the maintenance of the flush apparatus is easy while being cost effective.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A flush apparatus for a flush system, comprising:
a valve body having a water inlet for connecting to a water source to guide water to flow to said water inlet at a water-in direction, and a water outlet for connecting to the flush system;
a sensor, having a detecting range, for detecting a presence of a user of the flush system within said detecting range, wherein said sensor generates a first actuation signal when said sensor detects the presence of the user and generates a second actuation signal when said sensor detects the user being out of said detecting range;

a power generator, which is activated by said sensor; and an actuation control, which comprises:

a cartridge valve, which is detachably coupled to said power generator, comprising a cartridge housing stationary supported in said valve body at a position that a valve inlet of said cartridge housing is located at said water inlet and a valve outlet of said cartridge housing is located at said water outlet, a control disc unit which is supported in said cartridge housing at said valve inlet thereof and is orientated transversely to the water-in direction for resisting water pressure from said water source, wherein, in response to said sensor, said control disc unit is able to be driven to move by said power generator between a closed position, via said second actuation signal, to close said valve inlet for blocking the water to pass through said valve inlet, and an opened position, via said first actuation signal, to open up said valve inlet for allowing the water passing to said water outlet through said valve outlet so as to complete a flushing cycle of the flush system; and a manual flush actuator comprising a manual switch coupled at said cartridge valve to manually move said control disc unit between said closed position and said opened position, wherein said cartridge housing has a tubular surrounding wall defining an open end as said valve inlet and said valve outlet is formed at said surrounding wall of said cartridge housing to align with said water outlet, wherein said control disc unit comprises a sealing disc rotatably coupled within said surrounding wall at said open end thereof to selectively close said valve inlet, and a control shaft extended from said sealing disc through a closed end of said surrounding wall to operatively couple with said power generator so as to drive said sealing disc to rotate between said closed position and said opened position, wherein said manual switch coupled at said control shaft to manually drive said sealing disc to rotate between said closed position and said opened position, wherein said manual flush actuator further comprises a resilient element coupled at said manual switch to move back said manual switch after said manual switch is actuated.

2. A flush apparatus for a flush system, comprising:

a valve body having a water inlet for connecting to a water source to guide water to flow to said water inlet at a water-in direction, and a water outlet for connecting to the flush system;

a sensor, having a detecting range, for detecting a presence of a user of the flush system within said detecting range, wherein said sensor generates a first actuation signal when said sensor detects the presence of the user and generates a second actuation signal when said sensor detects the user being out of said detecting range;

a power generator, which is activated by said sensor; and an actuation control, which comprises:

a cartridge valve, which is detachably coupled to said power generator, comprising a cartridge housing stationary supported in said valve body at a position that a valve inlet of said cartridge housing is located at said water inlet and a valve outlet of said cartridge housing is located at said water outlet, a control disc unit which is supported in said cartridge housing at said valve inlet thereof and is orientated transversely to the water-in direction for resisting water pressure from said water source, wherein, in response to said sensor, said control disc unit is able to be driven to move by said power generator between a closed position, via said second actuation signal, to close said valve inlet for blocking the water to pass through said valve inlet, and an opened position, via said first actuation signal, to open up said valve inlet for allowing the water passing to said water outlet through said valve outlet so as to complete a flushing cycle of the flush system; and a manual flush actuator comprising a manual switch coupled at said cartridge valve to manually move said control disc unit between said closed position and said opened position, wherein said cartridge housing has a tubular surrounding wall defining an open end as said valve inlet and said valve outlet is formed at said surrounding wall of said cartridge housing to align with said water outlet, wherein said control disc unit comprises a sealing disc rotatably coupled within said surrounding wall at said open end thereof to selectively close said valve inlet, and a control shaft extended from said sealing disc through a closed end of said surrounding wall to operatively couple with said power generator so as to drive said sealing disc to rotate between said closed position and said opened position, wherein said control disc unit further comprises a stationary disc non-rotatably coupled at said cartridge housing, wherein said stationary disc comprises a plurality of valve sectors spacedly sealed at said open end of said surrounding wall and a plurality of opening sectors alternating with said valve sectors, such that said control disc unit is moved at said closed position when said sealing disc is rotated to close said opening sectors, wherein said manual switch coupled at said control shaft to manually drive said sealing disc to rotate between said closed position and said opened position, wherein said manual flush actuator further comprises a resilient element coupled at said manual switch to move back said manual switch after said manual switch is actuated.

3. A flush apparatus for a flush system, comprising:

a valve body having a water inlet for connecting to a water source to guide water to flow to said water inlet at a water-in direction, and a water outlet for connecting to the flush system;

a sensor, having a detecting range, for detecting a presence of a user of the flush system within said detecting range, wherein said sensor generates a first actuation signal when said sensor detects the presence of the user and generates a second actuation signal when said sensor detects the user being out of said detecting range;

a power generator, which is activated by said sensor; and an actuation control, which comprises:

a cartridge valve, which is detachably coupled to said power generator, comprising a cartridge housing stationary supported in said valve body at a position that a valve inlet of said cartridge housing is located at said water inlet and a valve outlet of said cartridge housing is located at said water outlet, a control disc unit which is supported in said cartridge housing at said valve inlet thereof and is orientated transversely to the water-in direction for resisting water pressure from said water source, wherein, in response to said sensor, said control disc unit is able to be driven to move by said power generator between a closed position, via said second actuation signal, to close said valve inlet for blocking the water to pass through said valve inlet, and an opened position, via said first actuation signal, to open up said valve inlet for allowing the water passing to said water outlet through said valve outlet so as to complete a flushing cycle of the flush system; and a manual flush actuator comprising a manual switch coupled at said cartridge valve to manually move said control disc unit between said closed position and said opened position, wherein said cartridge housing has a tubular surrounding wall defining an open end as said valve inlet and said valve outlet is formed at said surrounding wall of said cartridge housing to align with said water outlet, wherein said control disc unit comprises a sealing disc rotatably coupled within said surrounding wall at said open end thereof to selectively close said valve inlet, and a control shaft extended from said sealing disc through a closed end of said surrounding wall to operatively couple with said power generator so as to drive said sealing disc to rotate between said closed position and said opened position, wherein said sealing disc has a flat pressuring surface perpendicular to the water-in direction for biasing against water pressure from said water source, wherein said sealing disc comprises a plurality of disc sectors corresponding to said valve sectors, such that when said sealing disc is rotated to align said disc sectors with said valve sectors respectively, said opening sectors are opened for allowing the water to pass through, and when said sealing disc is rotated to align said disc sectors with said opening sectors respectively, said opening sectors are sealed and closed for blocking the water to pass through, wherein said manual switch coupled at said control shaft to manually drive said sealing disc to rotate between said closed position and said opened position, wherein said manual flush actuator further comprises a resilient element coupled at said manual switch to move back said manual switch after said manual switch is actuated.

\* \* \* \* \*